US011546881B2

(12) United States Patent  
Sarkis et al.

(10) Patent No.: US 11,546,881 B2  
(45) Date of Patent: Jan. 3, 2023

(54) RESOURCE RESELECTION IN SIDELINK

(71) Applicant: QUALCOMM Incorporated, San Diego, CA (US)

(72) Inventors: Gabi Sarkis, San Diego, CA (US); Kapil Gulati, Belle Mead, NJ (US); Tien Viet Nguyen, Bridgewater, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 16/950,767

(22) Filed: Nov. 17, 2020

(65) Prior Publication Data

US 2021/0153167 A1 May 20, 2021

Related U.S. Application Data

(60) Provisional application No. 62/937,200, filed on Nov. 18, 2019.

(51) Int. Cl.  
*H04W 4/00* (2018.01)  
*H04W 72/02* (2009.01)  
(Continued)

(52) U.S. Cl.  
CPC ....... *H04W 72/02* (2013.01); *H04W 72/0406* (2013.01); *H04W 72/0446* (2013.01); *H04W 72/10* (2013.01)

(58) Field of Classification Search  
CPC ............. H04W 72/02; H04W 72/0406; H04W 72/0446; H04W 72/10; H04W 92/18  
(Continued)

(56) References Cited

U.S. PATENT DOCUMENTS

2018/0049220 A1* 2/2018 Patil ................. H04W 72/0426  
2019/0306835 A1* 10/2019 Hoang .............. H04W 72/0493  
(Continued)

FOREIGN PATENT DOCUMENTS

EP          3745768 A1   12/2020  
WO     2019154333 A1    8/2019

OTHER PUBLICATIONS

Apple: "Resource Allocation for Mode 2", 3GPP Draft, 3GPP TSG RAN WG1 #99, R1-1912812, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823612, pp. 1-9, Retrieved from the Internet: URL: https://ftp.3gpp.org/tsg_ran/WG1_RL1/TSGR1_99/Docs/R1-1912812.zip R1-1912812 Resource Allocation for Mode 2 .docx [retrieved on Nov. 9, 2019] Resource selection procedure; p. 3, paragraph 2.3-p. 4 Resource reservation; p. 4, paragraph 2.4—p. 8.

(Continued)

*Primary Examiner* — Chuong T Ho  
(74) *Attorney, Agent, or Firm* — Arent Fox, LLP

(57) ABSTRACT

A user equipment (UE) determines that at least one resource of a first set of resources selected by the UE for sidelink communication overlaps with a second set of resources reserved by a set of UEs. The UE determines whether to reselect at least a subset of the first set of resources for a sidelink transmission upon determining that the at least one resource is an overlapping resource. The at least a subset of the first set of resources includes one of a first overlapping resource of the overlapping resource, the overlapping resource, or the overlapping resource and at least a subset of non-overlapping resources of the first set of resources.

28 Claims, 12 Drawing Sheets

(51) Int. Cl.
 *H04W 72/04* (2009.01)
 *H04W 72/10* (2009.01)

(58) Field of Classification Search
 USPC .................................................. 370/329, 330
 See application file for complete search history.

(56) References Cited

U.S. PATENT DOCUMENTS

| | | | |
|---|---|---|---|
| 2020/0296692 A1* | 9/2020 | Lee | H04W 8/24 |
| 2020/0351894 A1* | 11/2020 | Seo | H04W 72/02 |
| 2021/0045088 A1* | 2/2021 | Cai | H04W 72/04 |
| 2021/0105104 A1* | 4/2021 | Cao | H04L 1/1896 |
| 2021/0127383 A1* | 4/2021 | Hui | H04W 72/10 |
| 2021/0144750 A1* | 5/2021 | Cao | H04W 72/14 |
| 2021/0352710 A1* | 11/2021 | Lu | H04W 28/26 |
| 2022/0167362 A1* | 5/2022 | Liu | H04W 74/08 |
| 2022/0191919 A1* | 6/2022 | Lee | H04L 1/1812 |
| 2022/0256579 A1* | 8/2022 | Ji | H04W 72/0406 |

OTHER PUBLICATIONS

Intel Corporation: "Design of Resource Allocation Mode-2 for NR V2X Sidelink Communication," 3GPP Draft, 3GPP TSG RAN WG1 Meeting #99, R1-1912205, 3rd Generation Partnership Project (3GPP), Mobile Competence Centre, 650, Route Des Lucioles, F-06921, Sophia-Antipolis Cedex, France, vol. RAN WG1, No. Reno, USA; Nov. 18, 2019-Nov. 22, 2019, Nov. 9, 2019 (Nov. 9, 2019), XP051823282, pp. 1-32, Retrieved from the Internet: URL: https://ftp.3gpp.org/tsg_ran/WG1_RL1/TSGR1_99/Docs/R1-1912205. zip R1-1912205 Intel—V2X SL M2.docx [retrieved on Nov. 9, 2019] Sensing, Resource Selection and Scheduling Windows; p. 7, paragraph 2.4.1-p. 10, Sidelink Resource Reservation I Preemption; p. 15, paragraph 2.6-p. 16.
International Search Report and Written Opinion—PCT/US2020/061053—ISA/EPO—dated Feb. 17, 2021.

* cited by examiner

RESOURCE RESELECTION IN SIDELINK

CROSS-REFERENCE TO RELATED APPLICATION(S)

This application claims the benefit of U.S. Provisional Application Ser. No. 62/937,200, entitled "RESOURCE RESELECTION IN SIDELINK" and filed on Nov. 18, 2019, which is expressly incorporated by reference herein in its entirety.

BACKGROUND

Technical Field

The present disclosure relates generally to communication systems, and more particularly, to a wireless communication system that reselects and/or reserves resources for sidelink communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different user equipment (UE) to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In sidelink communication, a user equipment (UE) may reserve and/or reselect resources for later transmissions. The reservations may identify resources which overlap with resources selected for transmission or reserved by other UEs. A UE may determine when to reserve and/or reselect resources which it had selected but which overlap with a reservation of another UE, or may determine when to preempt a reservation of another UE.

In an aspect of the disclosure, a method, a computer-readable medium, and an apparatus are provided. The apparatus determines that at least one resource of a first set of resources selected by the UE for sidelink communication overlaps with a second set of resources reserved by a set of UEs; and determines whether to reselect at least a subset of the first set of resources for a sidelink transmission upon determining that the at least one resource is an overlapping resource, the at least a subset of the first set of resources comprising one of a first overlapping resource of the overlapping resource, the overlapping resource, or the overlapping resource and at least a subset of non-overlapping resources of the first set of resources.

In an aspect of the disclosure, a method, a computer-readable medium, and an apparatus are provided. The apparatus determines that at least one resource of a first set of resources selected by the UE for sidelink communication overlaps with a second set of resources reserved by a set of UEs; and determines, upon determining that the at least one resource is an overlapping resource, whether to reserve the at least one resource for a sidelink transmission when at least one of a first priority associated with the at least one resource is the same as a second priority associated with the second set of resources, a remaining time in a packet delay budget (PDB) for a sidelink transmission on the first set resources is greater than a threshold, or the remaining time in the PDB is greater than a remaining time in a PDB associated with the set of UEs for the second set of resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
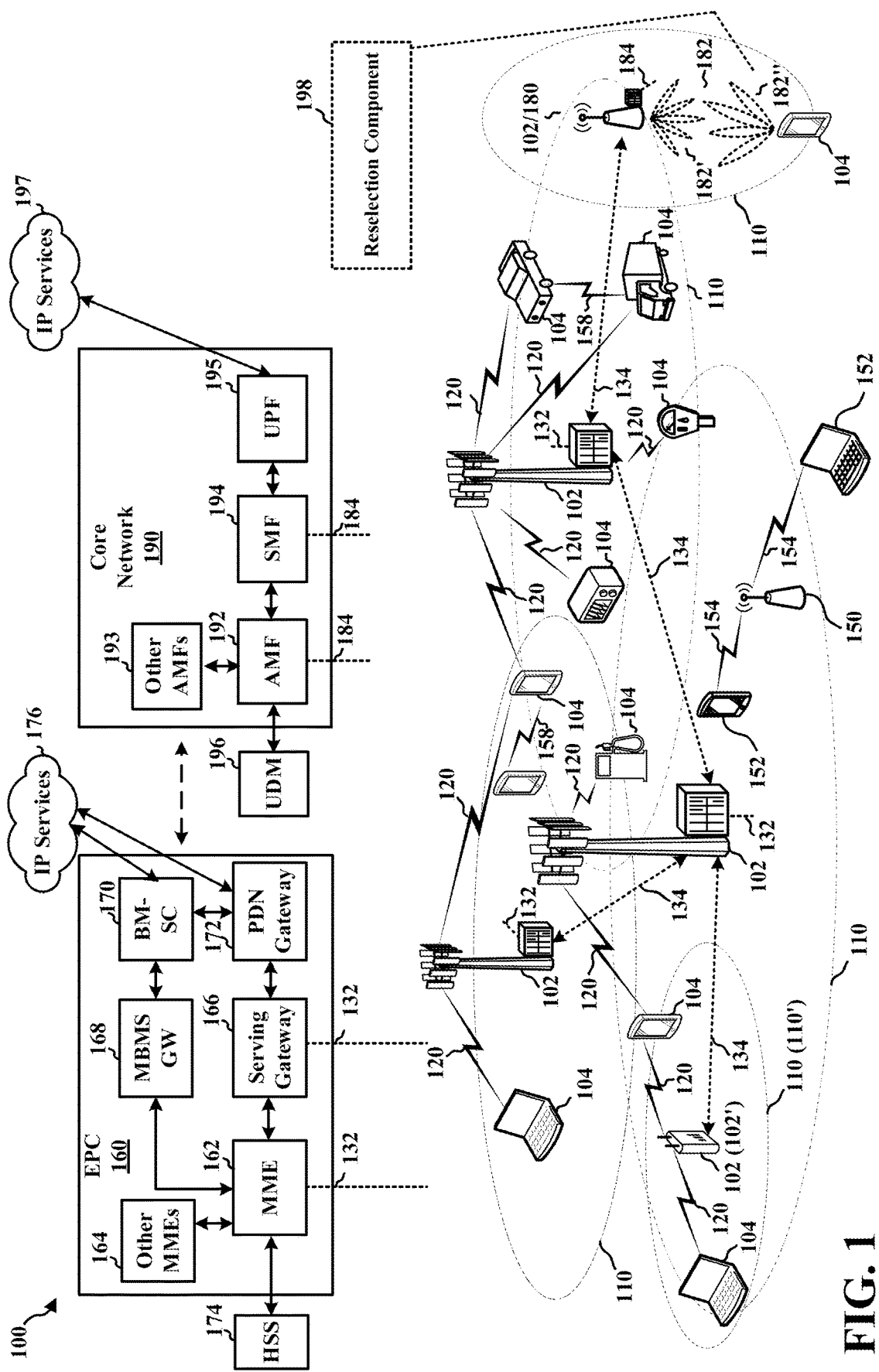
FIG. 1 is a diagram illustrating an example of a wireless communications system and an access network in accordance with an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine that at least one resource of a first set of resources selected by the UE for sidelink communication overlaps with a second set of resources reserved by a set of UEs, and the UE 104 may also be configured to determine, upon determining that the at least one resource is an overlapping resource, whether to reselect at least a subset of the first set of resources for a sidelink transmission, the at least a subset of the first set of resources comprising one of a first overlapping resource of the overlapping resource, the overlapping resource, or the overlapping resource and at least a subset of non-overlapping resources of the first set of resources, as shown in 198. Although the following description may be focused on 5G NR, the concepts described herein may be applicable to other similar areas, such as LTE, LTE-A, CDMA, GSM, and other wireless technologies.

Figure 2:
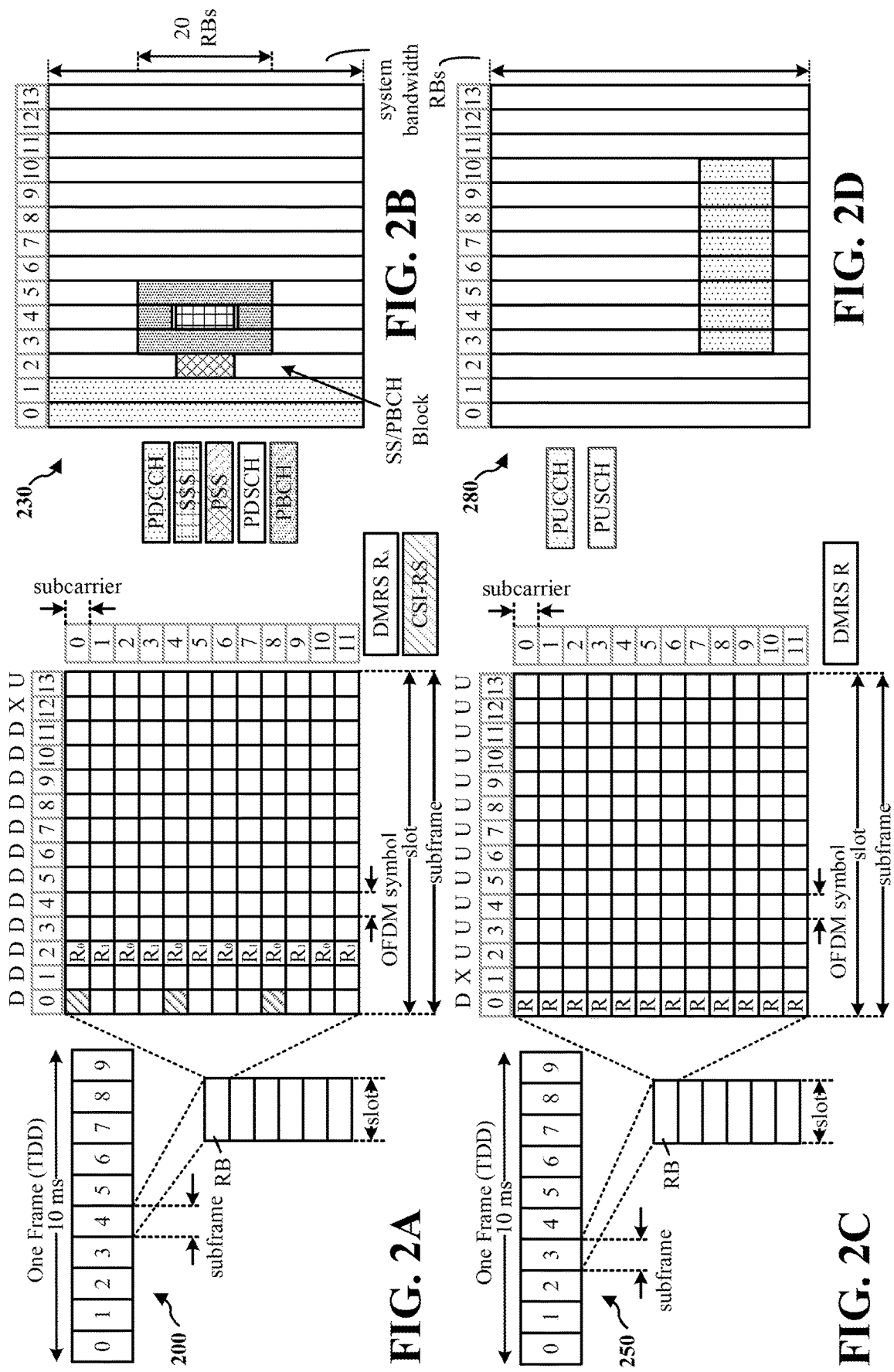
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, in accordance with an aspect of the present disclosure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu v=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
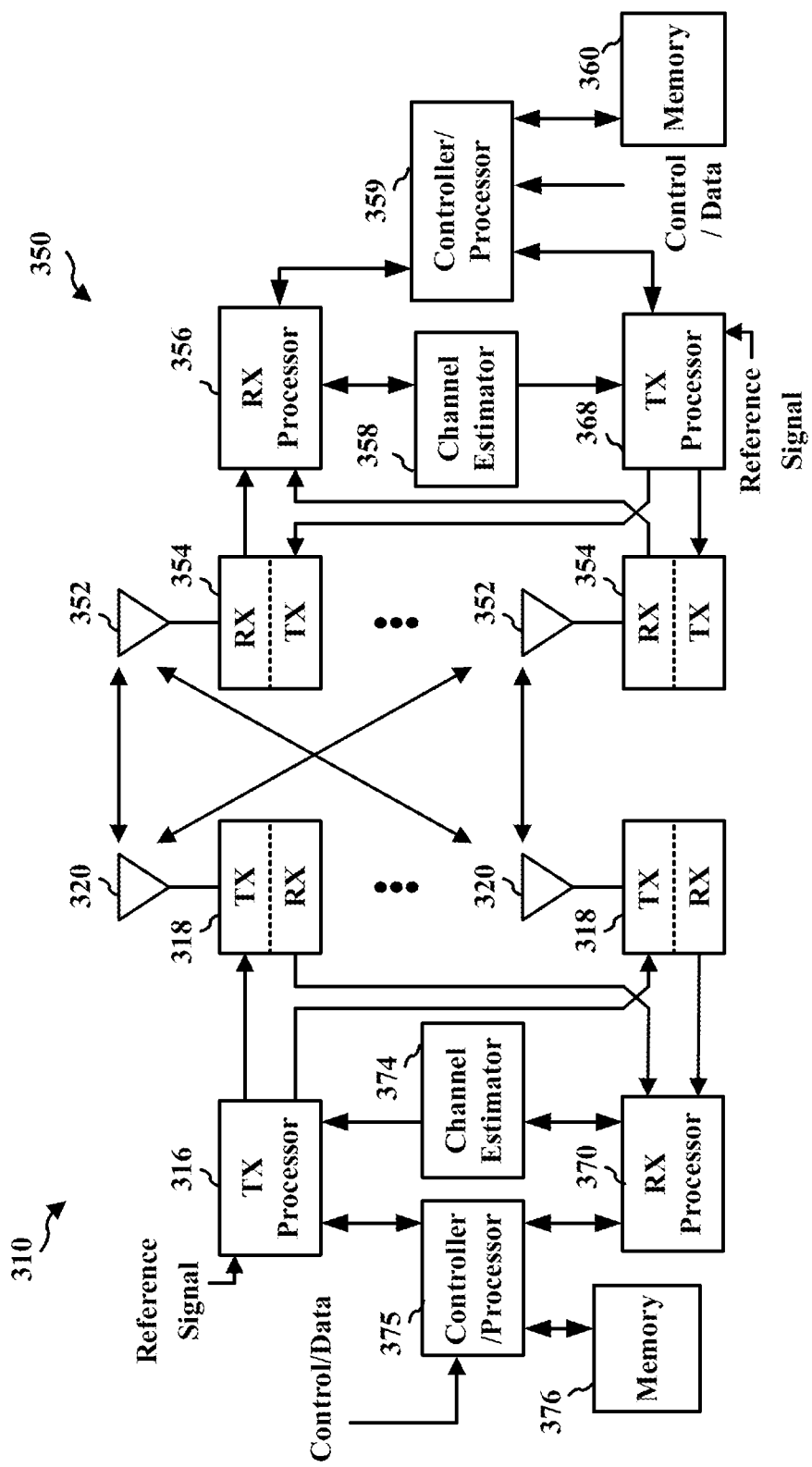
FIG. 3 is a diagram illustrating an example of a base station and user equipment (UE) in an access network in accordance with an aspect of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
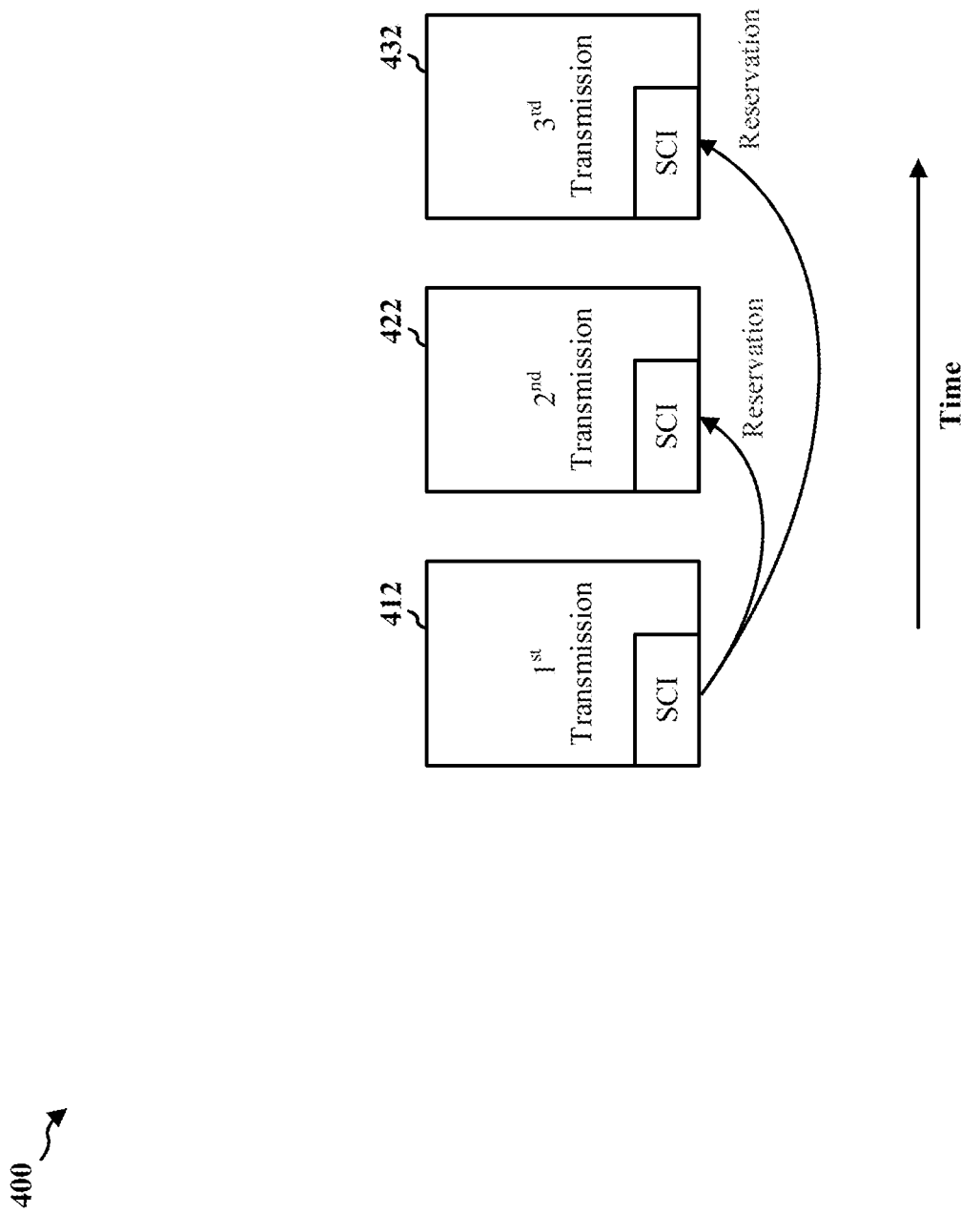
FIG. 4 is a diagram illustrating resource allocation in sidelink communication.

FIG. 4 is a diagram 400 illustrating resource allocation in sidelink communication. A UE may select resources for a sidelink transmission. The UE may select resources for a current transmission, or may select the resources to reserve for a future transmission. When a UE transmits a sidelink communication, it may include sidelink control information (SCI). The UE may include a reservation of future resources in the SCI to be transmitted to the other UEs. For example, as illustrated in FIG. 4, a UE may select first transmission resources 412 for a first transmission, and the first transmission may include SCI which reserves future resources for a second transmission 422 and for a third transmission 432. In some aspects, a sidelink transmission may include SCI reserving resources for two future transmissions.

Figure 5:
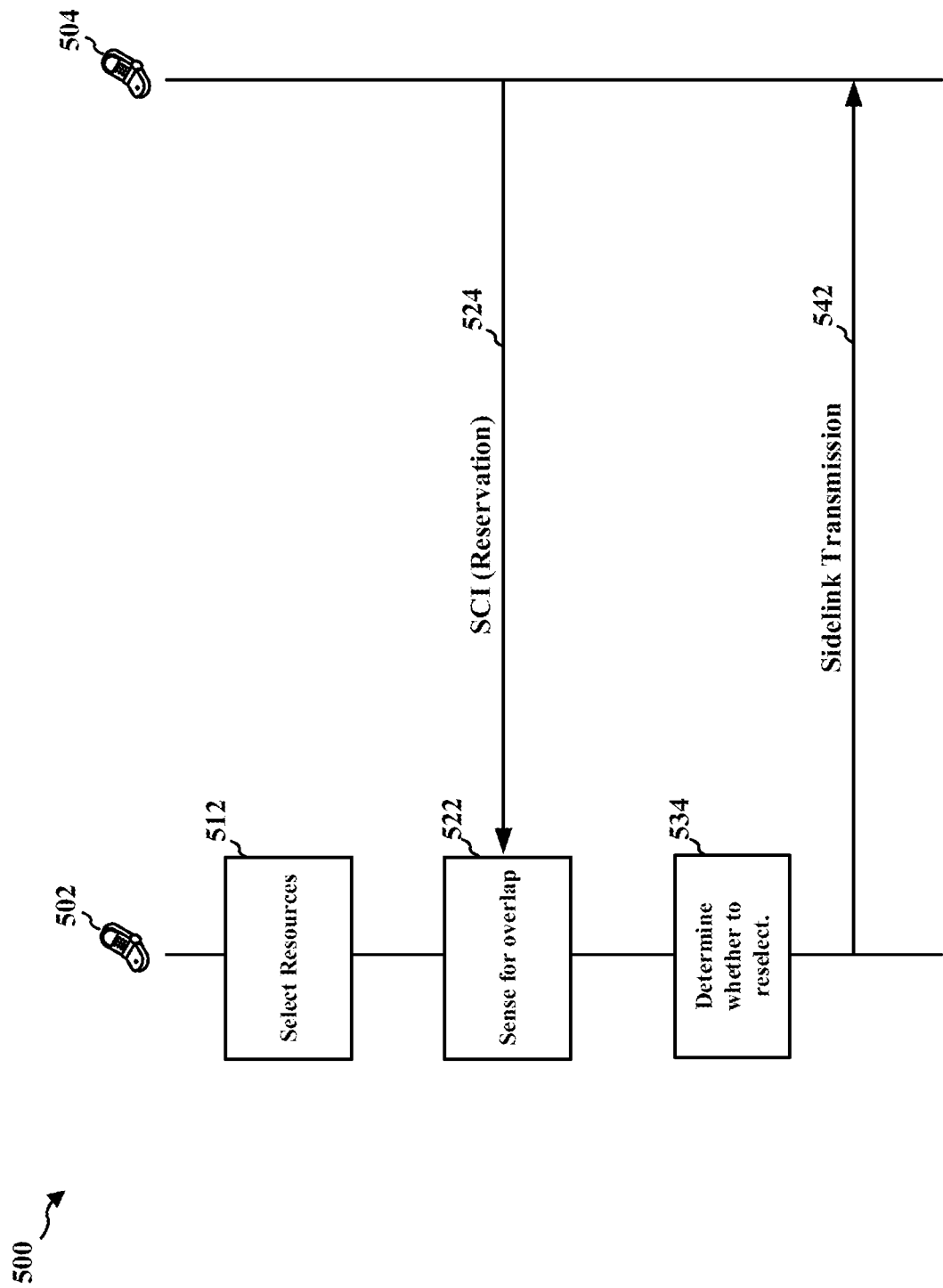
FIG. 5 is a communication flow diagram illustrating a reservation overlap in sidelink communication in accordance with an aspect of the present disclosure.

FIG. 5 is a communication flow diagram 500 illustrating a reservation overlap in sidelink communication. As illustrated at 512, A first UE 502 may select resources for a sidelink transmission. The first UE 502 may select the resources for a transmission which the UE 502 is currently preparing to transmit, or may select the resources to identify in a reservation in the SCI of a transmission which the UE 502 is currently preparing to transmit.

The UE 502 may receive SCI 524 from another UE 504, and the SCI 524 may include a reservation of future resources. As illustrated at 522, the UE 502 may sense for an overlap between the resources selected at 512 and resources reserved by other UEs. The reservation of future resources in the SCI 524 may identify some or all of the resources selected at 512, which may be referred to as an overlap. In some aspects, the UE 502 may have selected the resources for current transmission but may not have transmitted on the resources prior to receiving the overlapping reservation in the SCI 524, or may have selected the resources for future reservation but may not have transmitted the reservation prior to receiving the overlapping reservation in the SCI 524. In some aspects, the UE 502 may have already transmitted a reservation for the selected resources, but the reservation received in the SCI 524 may be higher priority. Where the UE 502 has received SCI attempting to reserve some or all of the resources selected at 512, the UE 502 may determine that an overlap has occurred between resources which the UE 502 selected for transmission at 512 and resources reserved by another UE 504.

As illustrated at 534, upon determining that an overlap has occurred, the UE 502 may determine whether to reselect the resources selected at 512.

As illustrated at 542, the UE 502 transmits a sidelink transmission 542.

(Transmission may be on selected or reselected, based on 532). For example, in some aspects, the UE 502 may determine whether the time until the UE 502 is to transmit on the selected resources or to transmit SCI reserving the selected resources is greater than a threshold value. If the time is above the threshold, the UE 502 may reselect the resources selected at 512, and if the time is not above the threshold, the UE 502 may transmit the transmission on the resources selected at 512 or may transmit the SCI reserving the resources selected at 512. In some aspects, the UE 502 may compare a priority associated with its transmission with a priority of the transmission on the overlapping resources. If the transmission of the UE 502 has a higher priority, the UE 502 may transmit on the selected resources or may transmit the SCI reserving the selected resource, and if the transmission on the overlapping resources has a higher priority, the UE 502 may reselect the resources selected at 512.

The UE 502 may transmit a sidelink transmission 542 to the other UE 504.

Where the UE 502 determined to reselect resources at 542, it may transmit the sidelink transmission 542 on the reselected resources or may include SCI reserving the reselected resources in the sidelink transmission 542. Where the UE 502 determined not to reselect resources at 542, the UE 502 may transmit the sidelink transmission 542 on the resources selected at 512 or may include SCI reserving the resources selected at 512 in the sidelink transmission 542.

Figure 6:
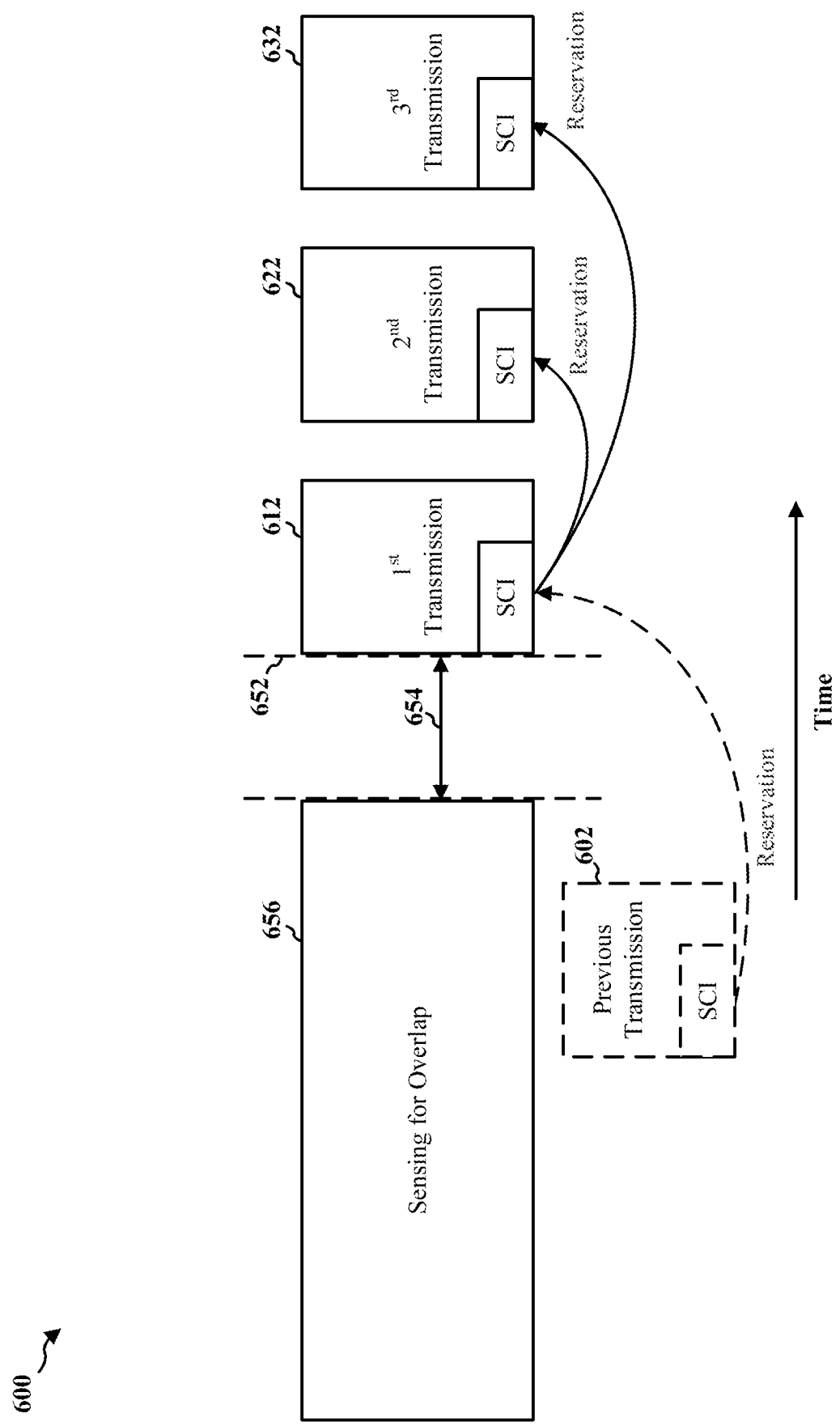
FIG. 6 is a diagram illustrating sensing for overlapping resources in accordance with an aspect of the present disclosure.

FIG. 6 is a diagram 600 illustrating sensing for overlapping resources. A UE may be preparing to transmit a first transmission 612 at a transmission time 652. The UE may be transmitting the first transmission 612 without a reservation, or the UE may be transmitting the first transmission 612 on resources reserved by a previous transmission 602. The first transmission 612 may include SCI which reserves resources for a second transmission 622 and a third transmission 632.

During a sensing period 656, the UE may be sensing for overlap between resources reserved by other UEs and the resources for the first transmission 612, the second transmission 622, and the third transmission 632. The UE may monitor reservations received from other UEs and may determine if the received reservations indicate resources which the UE had selected for the first transmission 612, the second transmission 622, or the third transmission 632. The UE may sense up until a threshold time 654 (e.g., a time T3) prior to the transmission time 652.

Figure 7:
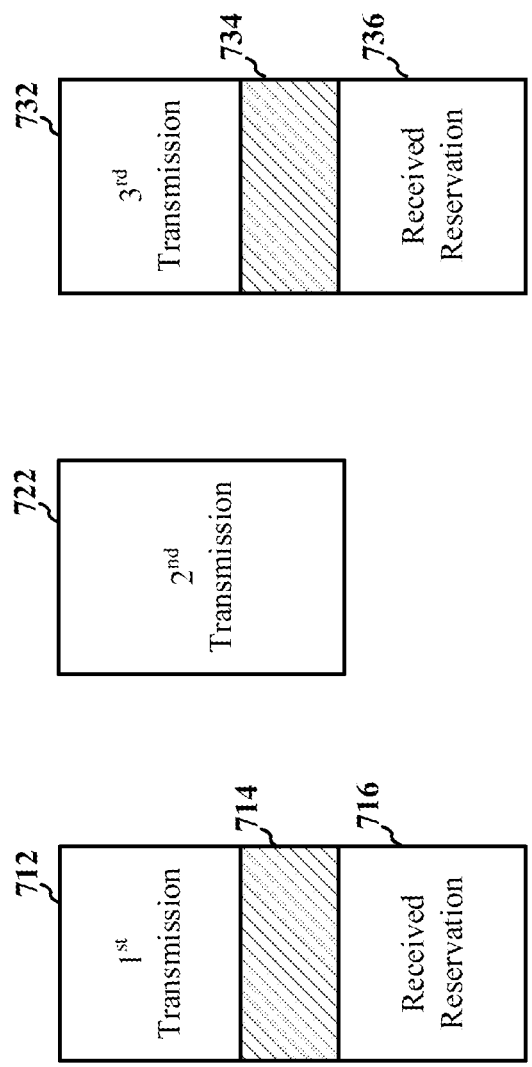
FIG. 7 is a diagram illustrating a received reservation overlapping with selected resources in accordance with an aspect of the present disclosure.

FIG. 7 is a diagram 700 illustrating a received reservation overlapping with selected resources. A UE may have selected resources for a first transmission 712, a second transmission 722, and a third transmission 732. For example, the first transmission 712, the second transmission 722, and the third transmission 732 may be the first transmission 612, the second transmission 622, and the third transmission 632 described in connection with FIG. 6. The UE may receive a reservation 716, and the received reservation 716 may identify overlapping resources 714 which overlap with the resources for the first transmission 712. The UE may receive a reservation 736, and the received reservation 736 may identify overlapping resources 734 which overlap with the resources the UE had reserved or had planned to reserve for the third transmission 732.

If the UE received the received reservation 716 or the received reservation 736 and detected the overlap ping resources 714 or 734 during the sensing period 656, the UE may reselect some or all of the resources selected for the first transmission 712, the second transmission 722, or the third transmission 732. In some aspects, the UE may reselect the first overlapping resource in the SCI it is to send. For example, the UE may reselect the resources for the first transmission 712, or just the overlapping resources 714, but may not reselect the resources for the second transmission 722 or the resources for the third transmission 732 (including the overlapping resources 732). In some aspects, the UE may reselect the overlapping resource, but not reselect the non-overlapping resources. For example, the UE may reselect the overlapping resources 714 and 734, but may not reselect the non-overlapping resources of the first transmission 712 and the third transmission 732.

In some aspects, the UE may reselect non-overlapping resources in addition to overlapping resources. The UE may reselect non-overlapping resources due to processing timeline issues. For example, a future resource may be overlapping, but the UE may not be able to find new resources and update SCI before the original transmission time. As illustrated in FIG. 7, the UE may not be able to find resources to reselect for the third transmission 732 prior to transmitting the first transmission 712 reserving the resources for the third transmission, so the UE may reselect the resources for the first transmission 712, including the non-overlapping resources. The UE may not be able to find resources to reselect for the first transmission 712 prior to the resources selected for the second transmission 722, so the UE may reselect the resources for the first transmission 712 and reselect the resources for the second transmission 722 to resources after the resources reselected for the first transmission 712. The UE may reselect non-overlapping resources due to signaling restrictions. For example, SCI may only signal reservations that are a set number of slots apart. The UE may reselect the same resources for non-overlapping resources or may choose different resources. In some aspects, the UE behavior with respect to which resources are reselected may be configured or preconfigured per resource pool.

In some aspects, if the UE receives the received reservation 716 or the received reservation 736 after the sensing period 656, the UE may or may not reselect resources based on the received reservations 716 and 736.

In some aspects, the UE may compare a priority of its transmission with that of a received reservation with overlapping resources. For example, the UE may compare a priority of the received reservation 716 with a priority of the first transmission 712, or may compare a priority of the received transmission 736 with a priority of the third transmission 732. In some aspects, if the received reservation has a higher priority, the UE may reselect the overlapping resources, and if the received reservation has the same or a lower priority, the UE may not reselect the overlapping resources. In some aspects, if the received reservation has the same priority, the UE may reselect the overlapping resources. In some aspects, if the received reservation has the same priority as the transmission of the UE and the UE has not transmitted SCI reserving the resources for its transmission, the UE may reselect the overlapping resources, but if the received reservation has the same priority and the UE already reserved the resources for its transmission, the UE may not reselect the overlapping resources.

In some aspects, the UE may compare a packet delay budget of a transmission with a packet delay budget of a received reservation to determine whether to reselect resources. In some aspects, if the packet delay budget of the UE is greater than the packet delay budget of the received reservation, the UE may reselect the overlapping resources. In some aspects, if the packet delay budget of the transmission of the UE is above a threshold time (e.g., an amount of time for the UE to which it takes the UE to reselect resources), the UE may reselect the overlapping resources.

Figure 8:
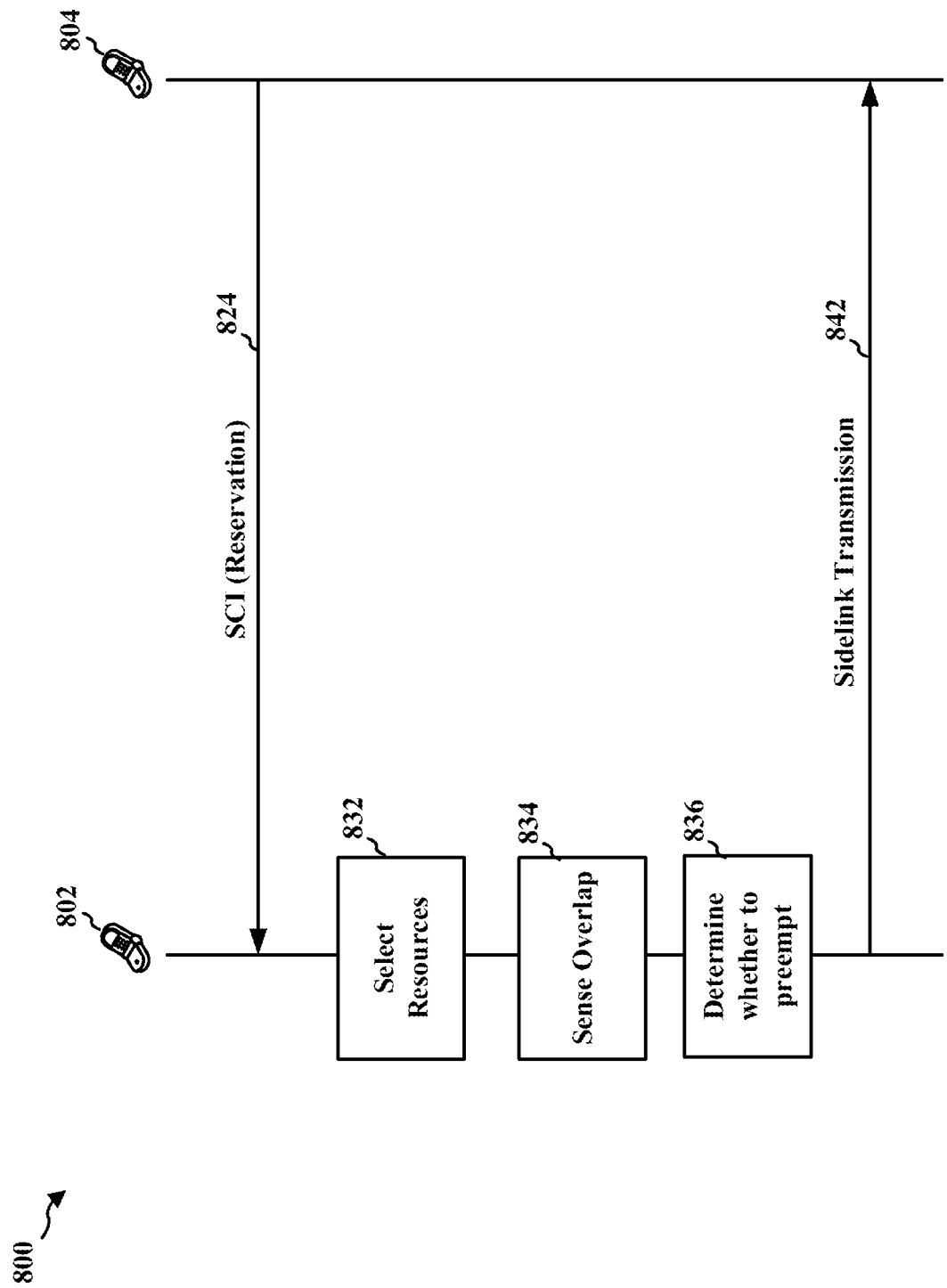
FIG. 8 is a communication flow diagram illustrating reservation preemption in sidelink communication in accordance with an aspect of the present disclosure.
Figure 9:
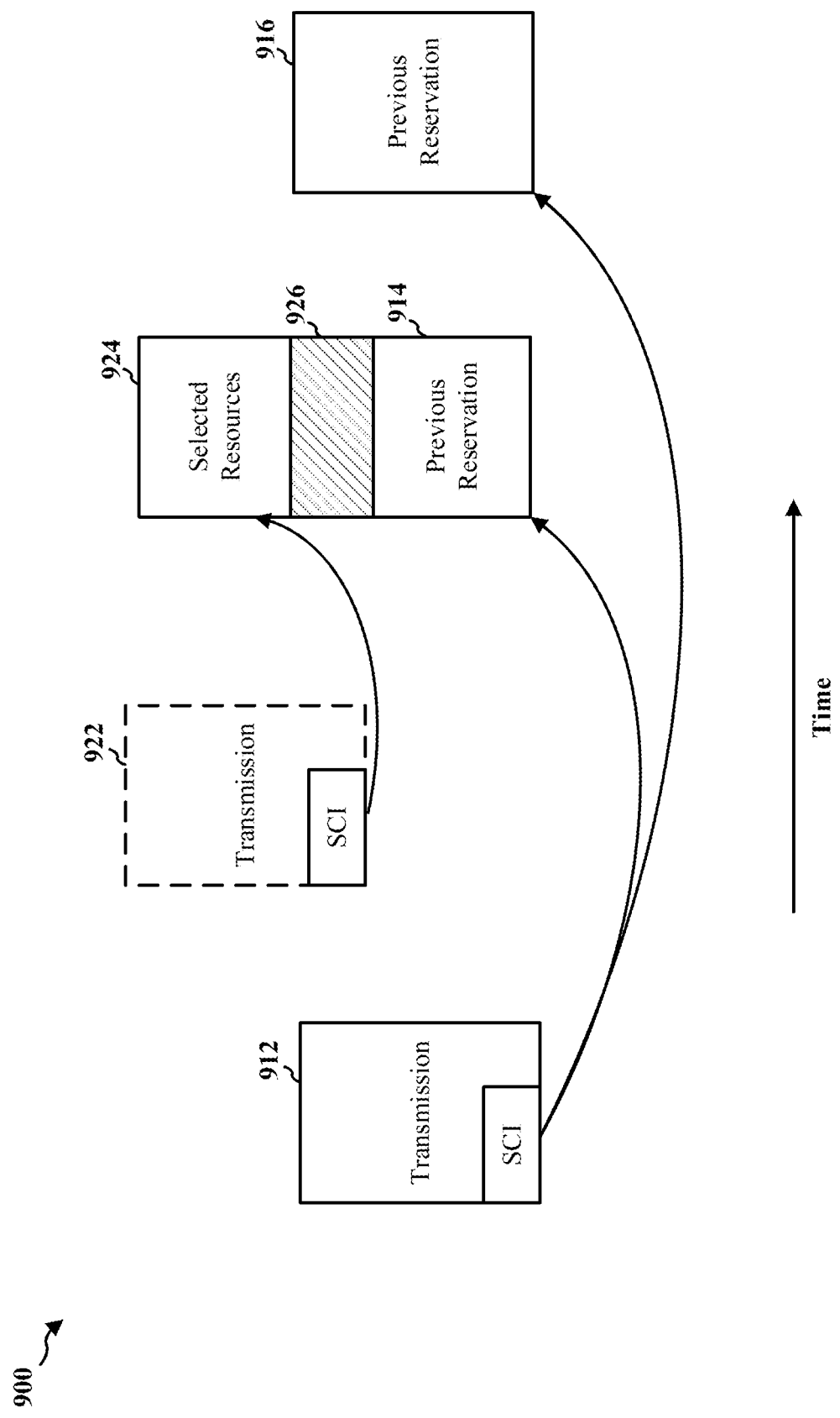
FIG. 9 is a diagram illustrating selected resources overlapping with a previous reservation in accordance with an aspect of the present disclosure.

FIG. 8 is a communication flow diagram 800 illustrating reservation preemption in sidelink communication. FIG. 9 is a diagram illustrating selected resources overlapping with a previous reservation. A UE 802 may receive SCI 824 from another UE 804 reserving resources for a future transmission of the other UE 804. For example, the SCI 824 may be received in a transmission 912 from the UE 804, and may include previous reservations 914 and 916 identifying resources for future transmissions for the UE 804.

As illustrated at 832, the UE 802 may select resources for a future transmission of the UE 802. For example, the UE 802 may select resources 924 for the future transmission. As illustrated at 834, the UE 802 may determine that the resources selected at 832 overlap with the resources reserved in the SCI 824. For example, the UE 802 may determine that selected resources 924 and the previous reservation 914 both indicate overlapping resources 926.

As illustrated at 836, the UE 802 may determine whether to preempt the previous reservation. The UE 802 may compare a priority of the transmission of the UE 802 (e.g., a priority of the transmission for the selected resources 924) with a priority of the transmission of the UE 804 (e.g., a priority of the transmission for the previous reservation 914). The UE 802 may then determine whether to preempt the previous reservation based on the comparison of the priority of the transmission of the UE 802. In some aspects, the UE 802 may determine to preempt the previous reservation 914 if the transmission of the UE 802 has a higher priority than the transmission of the UE 804. In some aspects, the UE 802 may determine to preempt the previous reservation 914 if the transmission of the UE 802 has a the same priority as the transmission of the UE 804. In some aspects, the UE 802 may compare the packet delay budget of the transmission of the UE 804 on the resources of the previous reservation 914 with the packet delay budget of the transmission of the UE 802 on the selected resources 924. The UE 802 may determine to preempt the previous reservation 914 if the time remaining in the packet delay budget of the transmission of the UE 802 is less than the time remaining in the packet delay budget of the transmission of the UE 804. In some aspects, the UE 802 may determine to preempt the previous reservation 914 if the time remaining in the packet delay budget of the transmission of the UE 802 on the selected resources 924 is insufficient to delay transmission without exceeding the packet delay budget.

Figure 10:
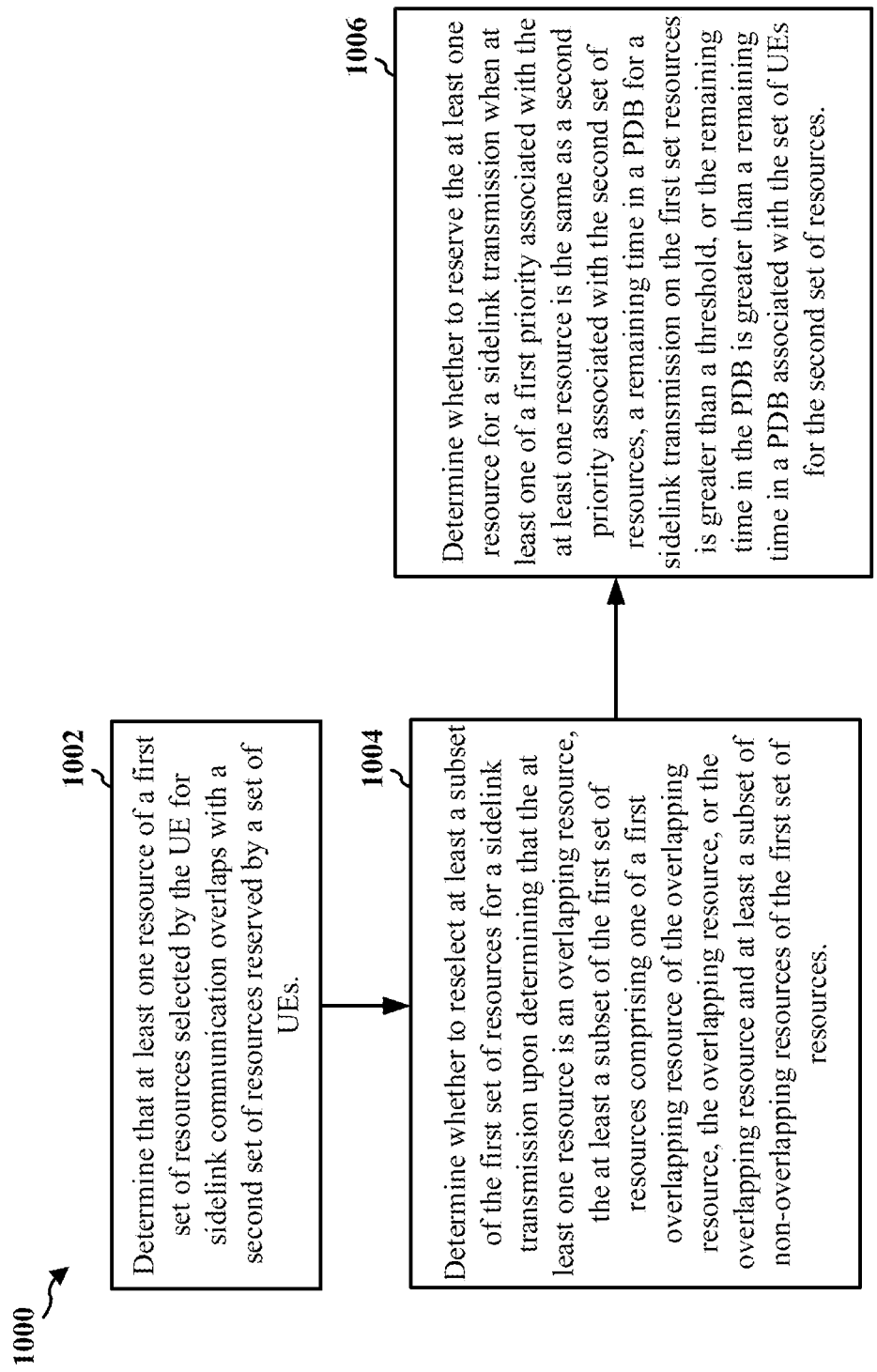
FIG. 10 is a flowchart of a method of wireless communication in accordance with an aspect of the present disclosure.

FIG. 10 is a flowchart 1000 of a method of wireless communication. The method may be performed by a UE (e.g., the UE 350, 502, which may include the memory 360 and which may be the entire UE or a component of the UE, such as the TX processor 368, the RX processor 356, and/or the controller/processor 359).

At 1002, the UE determines that at least one resource of a first set of resources selected by the UE for sidelink communication overlaps with a second set of resources reserved by a set of UEs. The at least one resource may at least partially overlap with the second set of resources. The at least one resource may completely overlap with the second set of resources. For example, in the context of FIG. 5, 1002 may be performed by UE 502 selecting at least one resource in a first set of resources as described with respect to 512, and sensing that there is an overlap of the at least one resource with a second set of resources as described with respect to 522.

In some aspects, the UE may receive SCI from the set of UEs, the received SCI indicating the second set of resources. For example, in the context of FIG. 5, UE 502 may receive SCI as described in 524.

At 1004, the UE determines whether to reselect at least a subset of the first set of resources for a sidelink transmission upon determining that the at least one resource is an overlapping resource, the at least a subset of the first set of resources comprising one of a first overlapping resource of the overlapping resource, the overlapping resource, or the overlapping resource and at least a subset of non-overlapping resources of the first set of resources. For example, in the context of FIG. 5, 1004 may be performed by UE 502 ascertaining that there is an overlap of the at least one resource in 522, reviewing the resources selected in 512, and reselecting at least a subset of resources in the first set of resources as described with respect to 534.

The UE may determine to reselect the at least the subset of the first set of resources when a remaining time in a packet delay budget for a sidelink transmission on the first set of resources is greater than a threshold.

The UE may have a first transmission priority associated with transmitting in the first set of resources, and the UE may determine to reselect the at least the subset of the first set of resources when the overlapping resources are associated with one or more transmission priorities that are higher than the first transmission priority. The UE may have a first transmission priority associated with transmitting in the first set of resources, and the UE may determine to reselect the at least the subset of the first set of resources when the overlapping resources are associated with one or more transmission priorities that is the same as the first transmission priority. The UE may have a first transmission priority associated with transmitting in the first set of resources, and the UE may determine to reselect the at least the subset of the first set of resources when the overlapping resources are associated with one or more transmission priorities that is the same as the first transmission priority and that the first set of resources are unreserved through transmission of SCI.

At 1006, the UE determines, upon determining that the at least one resource is an overlapping resource, whether to reserve the at least one resource for a sidelink transmission when at least one of a first priority associated with the at least one resource is the same as a second priority associated with the second set of resources, a remaining time in a PDB for a sidelink transmission on the first set resources is greater than a threshold, or the remaining time in the PDB is greater than a remaining time in a PDB associated with the set of UEs for the second set of resources. The UE may determine to reserve the at least one resource when the first priority associated with the at least one resource is the same as the second priority associated with the second set of resources. For example, in the context of FIG. 8, 1006 may be performed by UE 802 selecting at least one resource in a first set of resources as described with respect to 832, and sensing that there is an overlap of the at least one resource with a second set of resources as described with respect to 834, and reserving the at least one resource for a sidelink transmission as described with respect to 836.

The UE may determine to reserve the at least one resource when the remaining time in the PDB for the sidelink transmission on the first set resources is greater than the threshold. The UE may determine to reserve the at least one resource when the first priority associated with the at least one resource is the same as the second priority associated with the second set of resources and the remaining time in the PDB for the sidelink transmission on the first set resources is greater than the threshold. The UE may determine to reserve the at least one resource when the remaining time in the PDB for the sidelink transmission on the first set resources is greater than the remaining time in the PDB associated with the set of UEs for the second set of resources.

In some aspects, the UE may reselect the at least the subset of the first set of resources for the sidelink transmission upon determining to reselect the at least the subset of the first set of resources. In some aspects, the UE may transmit SCI indicating the at least the subset of the first set of resources that were reselected. In some aspects, the UE may transmit sidelink control information or data to one or more UEs, the sidelink control information or data being transmitted within the at least the subset of the first set of resources that were reselected.

Figure 11:
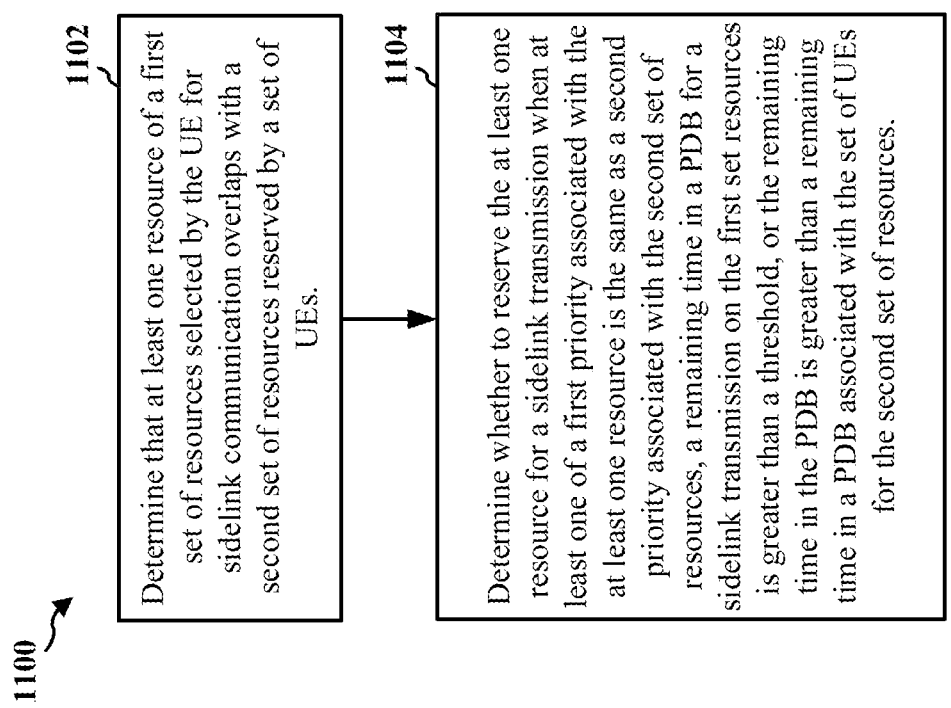
FIG. 11 is a flowchart of a method of wireless communication in accordance with an aspect of the present disclosure.

FIG. 11 is a flowchart 1100 of a method of wireless communication. The method may be performed by a UE (e.g., the UE 350, 802, which may include the memory 360 and which may be the entire UE or a component of the UE, such as the TX processor 368, the RX processor 356, and/or the controller/processor 359).

At 1102, the UE determines that at least one resource of a first set of resources selected by the UE for sidelink communication overlaps with a second set of resources reserved by a set of UEs. For example, in the context of FIG. 8, 1102 may be performed by UE 802 selecting at least one resource in a first set of resources as described with respect to 832, and sensing that there is an overlap of the at least one resource with a second set of resources as described with respect to 834.

At 1104, the UE determines, upon determining that the at least one resource is an overlapping resource, whether to reserve the at least one resource for a sidelink transmission when at least one of a first priority associated with the at least one resource is the same as a second priority associated with the second set of resources, a remaining time in a PDB for a sidelink transmission on the first set resources is greater than a threshold, or the remaining time in the PDB is greater than a remaining time in a PDB associated with the set of UEs for the second set of resources. For example, in the context of FIG. 8, 1006 may be performed by UE 802 selecting at least one resource in a first set of resources as described with respect to 832, sensing that there is an overlap of the at least one resource with a second set of resources as described with respect to 834, and reserving the at least one resource for a sidelink transmission as described with respect to 836.

The UE may determine to reserve the at least one resource when the first priority associated with the at least one resource is the same as the second priority associated with the second set of resources. The UE may determine to reserve the at least one resource when the remaining time in the PDB for the sidelink transmission on the first set resources is greater than the threshold. The UE may determine to reserve the at least one resource when the first priority associated with the at least one resource is the same as the second priority associated with the second set of resources and the remaining time in the PDB for the sidelink transmission on the first set resources is greater than the threshold. The UE may determine to reserve the at least one resource when the remaining time in the PDB for the sidelink transmission on the first set resources is greater than the remaining time in the PDB associated with the set of UEs for the second set of resources.

Figure 12:
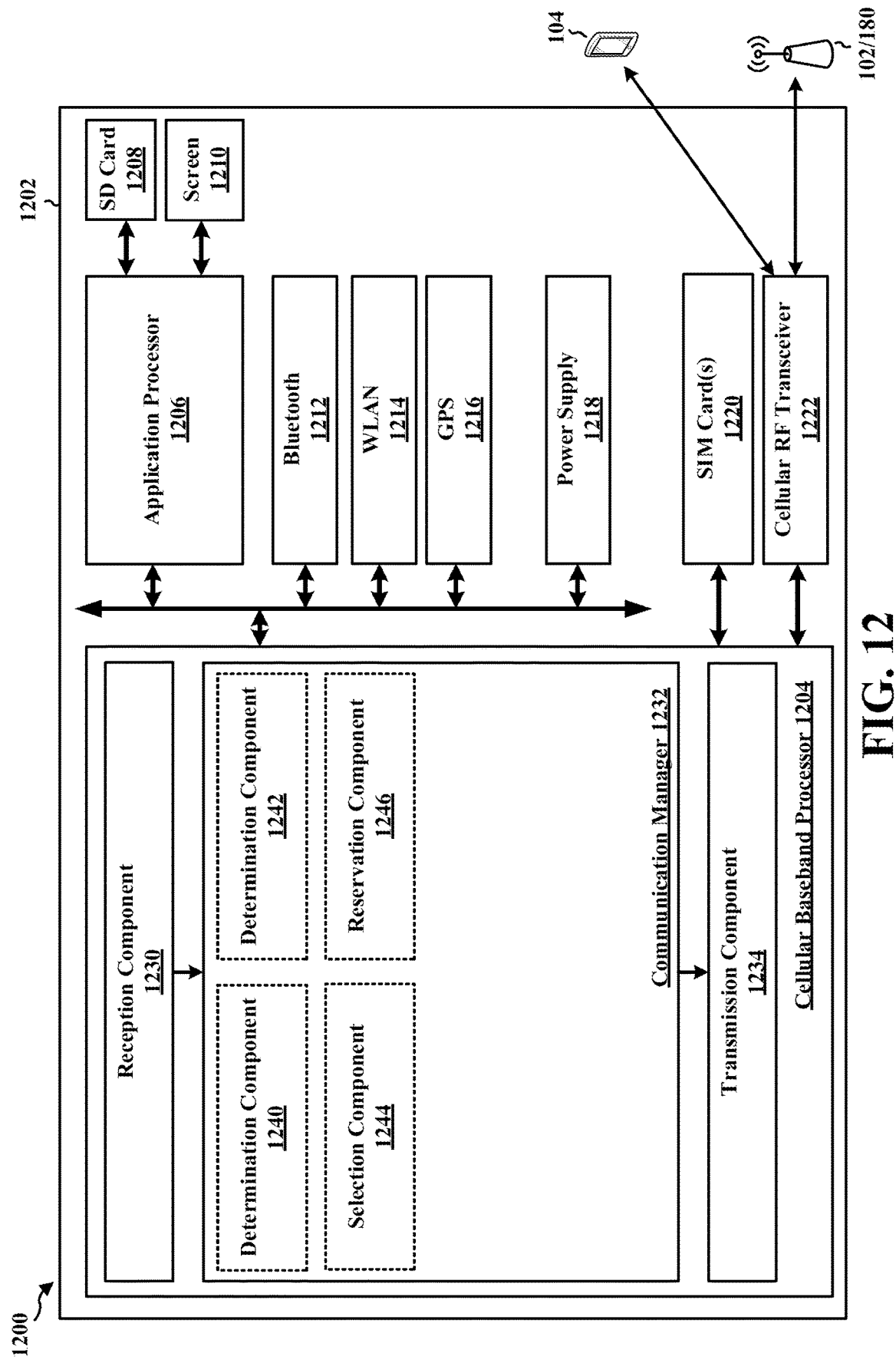
FIG. 12 is a diagram illustrating an example of a hardware implementation for an apparatus in accordance with an aspect of the present disclosure.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a determination component 1240 that is configured to determine that at least one resource of a first set of resources selected by the UE for sidelink communication overlaps with a second set of resources reserved by a set of UEs, e.g., as described in connection with 1002 of FIG. 10 and/or 1102 of FIG. 11.

The communication manager 1232 further includes a determination component 1242 that receives input from determination component 1240 and is configured to determine, upon determination component 1240 determining that the at least one resource is an overlapping resource, whether to reselect at least a subset of the first set of resources for a sidelink transmission the at least a subset of the first set of resources comprising one of a first overlapping resource of the overlapping resource, the overlapping resource, or the overlapping resource and at least a subset of non-overlapping resources of the first set of resources, e.g., as described in connection with 1004 of FIG. 10.

The apparatus 1202 may employ reception component 1230 to receive SCI from the set of UEs, the received SCI indicating the second set of resources as described in connection with 524 of FIG. 5.

The communication manager 1232 may further include a selection component 1244 that reselects the at least the subset of the first set of resources for the sidelink transmission upon determining to reselect the at least the subset of the first set of resources, as described in connection with 1004 of FIG. 10.

The apparatus 1202 may employ transmission component 1234 to transmit SCI indicating the at least the subset of the first set of resources that were reselected, as described in connection with 534 of FIG. 5.

The apparatus 1202 may employ transmission component 1234 to transmit sidelink control information or data to one or more UEs, the sidelink control information or data being transmitted within the at least the subset of the first set of resources that were reselected, as described in connection with 542 of FIG. 5.

The communication manager 1232 further includes a reservation component 1246 that receives input from the determination component 1240 and is configured to reserve, upon determination component 1240 determining that the at least one resource is an overlapping resource, the at least one resource for a sidelink transmission, when at least one of a first priority associated with the at least one resource is the same as a second priority associated with the second set of resources, a remaining time in a PDB for a sidelink transmission on the first set resources is greater than a threshold, or the remaining time in the PDB is greater than a remaining time in a PDB associated with the set of UEs for the second set of resources, e.g., as described in connection with 1006 of FIG. 10 and/or 1104 of FIG. 11.

The apparatus may include additional components that perform each of the blocks of the algorithm in the aforementioned flowcharts of FIGS. 10 and/or 11. As such, each block in the aforementioned flowcharts of FIGS. 10 and/or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for means for determining that at least one resource of a first set of resources selected by the UE for sidelink communication overlaps with a second set of resources reserved by a set of UEs. The apparatus 1202, and in particular the cellular baseband processor 1204, also includes means for determining, upon determining that the at least one resource is an overlapping resource, whether to reselect at least a subset of the first set of resources for a sidelink transmission the at least a subset of the first set of resources comprising one of a first overlapping resource of the overlapping resource, the overlapping resource, or the overlapping resource and at least a subset of non-overlapping resources of the first set of resources.

The apparatus 1202, and in particular the cellular baseband processor 1204, may also include means for reserving, upon determining that the at least one resource is an overlapping resource, the at least one resource for a sidelink transmission, when at least one of a first priority associated with the at least one resource is the same as a second priority associated with the second set of resources, a remaining time in a PDB for a sidelink transmission on the first set resources is greater than a threshold, or the remaining time in the PDB is greater than a remaining time in a PDB associated with the set of UEs for the second set of resources.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In sidelink communication, UEs may reserve and/or reselect resources for later transmissions. The reservations may identify resources which overlap with resources selected for transmission or reserved by other UEs. A UE may determine when to reselect and/or reserve resources which it had selected but which overlap with a reservation of another UE, or may determine when to preempt a reservation of another UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   determining that at least one resource of a first set of resources selected by the UE for sidelink communication overlaps with a second set of resources reserved by a set of UEs, wherein the UE has a first transmission priority associated with transmitting in the first set of resources; and
   determining, upon determining that the at least one resource is an overlapping resource, to reselect at least a subset of the first set of resources for a sidelink transmission when the overlapping resource is associated with one or more transmission priorities that are same as the first transmission priority, the at least a subset of the first set of resources comprising one of a first overlapping resource of the overlapping resource, the overlapping resource, or the overlapping resource and at least a subset of non-overlapping resources of the first set of resources.

2. The method of claim 1, wherein the at least one resource at least partially overlaps with the second set of resources.

3. The method of claim 1, wherein the at least one resource completely overlaps with the second set of resources.

4. The method of claim 1, further comprising receiving sidelink control information (SCI) from the set of UEs, the received SCI indicating the second set of resources.

5. The method of claim 1, further comprising reselecting the at least the subset of the first set of resources for the sidelink transmission upon determining to reselect the at least the subset of the first set of resources.

6. The method of claim 5, further comprising transmitting sidelink control information (SCI) indicating the at least the subset of the first set of resources that were reselected.

7. The method of claim 5, further comprising transmitting sidelink control information or data to one or more UEs, the sidelink control information or data being transmitted within the at least the subset of the first set of resources that were reselected.

8. The method of claim 1, wherein the UE has a first transmission priority associated with transmitting in the first set of resources, and the UE determines to reselect the at least the subset of the first set of resources when the overlapping resources are associated with one or more transmission priorities that is same as the first transmission priority and that the first set of resources are unreserved through transmission of sidelink control information (SCI).

9. The method of claim 1, wherein the UE determines to reselect the at least the subset of the first set of resources when a remaining time in a packet delay budget (PDB) for a sidelink transmission on the first set of resources is greater than a threshold.

10. The method of claim 1, further comprising:
    reserving the at least one resource for a sidelink transmission, upon determining that the at least one resource is an overlapping resource, when at least one of a first priority associated with the at least one resource is same as a second priority associated with the second set of resources, a remaining time in a packet delay budget (PDB) for a sidelink transmission on the first set resources is greater than a threshold, or the remaining time in the PDB is greater than a remaining time in a PDB associated with the set of UEs for the second set of resources.

11. The method of claim 10, wherein the UE determines to reserve the at least one resource when the first priority associated with the at least one resource is same as the second priority associated with the second set of resources.

12. The method of claim 10, wherein the UE determines to reserve the at least one resource when the remaining time in the PDB for the sidelink transmission on the first set resources is greater than the threshold.

13. The method of claim 10, wherein the UE determines to reserve the at least one resource when the first priority associated with the at least one resource is same as the second priority associated with the second set of resources and the remaining time in the PDB for the sidelink transmission on the first set resources is greater than the threshold.

14. The method of claim 10, wherein the UE determines to reserve the at least one resource when the remaining time in the PDB for the sidelink transmission on the first set resources is greater than the remaining time in the PDB associated with the set of UEs for the second set of resources.

15. An apparatus for wireless communication at a user equipment (UE), comprising:
a memory; and
at least one processor coupled to the memory and configured to:
determine that at least one resource of a first set of resources selected by the UE for sidelink communication overlaps with a second set of resources reserved by a set of UEs, wherein the UE has a first transmission priority associated with transmitting in the first set of resources; and
determine, upon determining that the at least one resource is an overlapping resource, to reselect at least a subset of the first set of resources for a sidelink transmission when the overlapping resource is associated with one or more transmission priorities that are same as the first transmission priority, the at least a subset of the first set of resources comprising one of a first overlapping resource of the overlapping resource, the overlapping resource, or the overlapping resource and at least a subset of non-overlapping resources of the first set of resources.

16. The apparatus of claim 15, wherein the at least one resource at least partially overlaps with the second set of resources or completely overlaps with the second set of resources.

17. The apparatus of claim 15, wherein the processor is further configured to receive sidelink control information (SCI) from the set of UEs, the received SCI indicating the second set of resources.

18. The apparatus of claim 15, wherein the processor is further configured to reselect the at least the subset of the first set of resources for the sidelink transmission upon determining to reselect the at least the subset of the first set of resources.

19. The apparatus of claim 18, wherein the processor is further configured to transmit sidelink control information (SCI) indicating the at least the subset of the first set of resources that were reselected.

20. The apparatus of claim 18, wherein the processor is further configured to transmit sidelink control information or data to one or more UEs, the sidelink control information or data being transmitted within the at least the subset of the first set of resources that were reselected.

21. The apparatus of claim 15, wherein the UE has a first transmission priority associated with transmitting in the first set of resources, and the UE determines to reselect the at least the subset of the first set of resources when the overlapping resources are associated with one or more transmission priorities that is same as the first transmission priority.

22. The apparatus of claim 15, wherein the UE has a first transmission priority associated with transmitting in the first set of resources, and the UE determines to reselect the at least the subset of the first set of resources when the overlapping resources are associated with one or more transmission priorities that is same as the first transmission priority and that the first set of resources are unreserved through transmission of sidelink control information (SCI).

23. The apparatus of claim 15, wherein the UE determines to reselect the at least the subset of the first set of resources when a remaining time in a packet delay budget (PDB) for a sidelink transmission on the first set of resources is greater than a threshold.

24. The apparatus of claim 15, wherein the at least one processor coupled to the memory is further configured to:
reserve, upon determining that the at least one resource is an overlapping resource, the at least one resource for a sidelink transmission, when at least one of a first priority associated with the at least one resource is same as a second priority associated with the second set of resources, a remaining time in a packet delay budget (PDB) for a sidelink transmission on the first set resources is greater than a threshold, or the remaining time in the PDB is greater than a remaining time in a PDB associated with the set of UEs for the second set of resources.

25. The apparatus of claim 24, wherein the UE determines to reserve the at least one resource when the first priority associated with the at least one resource is same as the second priority associated with the second set of resources, when the remaining time in the PDB for the sidelink transmission on the first set resources is greater than the threshold, when the remaining time in the PDB for the sidelink transmission on the first set resources is greater than the remaining time in the PDB associated with the set of UEs for the second set of resources, or when the first priority associated with the at least one resource is same as the second priority associated with the second set of resources and the remaining time in the PDB for the sidelink transmission on the first set resources is greater than the threshold.

26. An apparatus for wireless communication at a user equipment (UE), comprising:
means for determining that at least one resource of a first set of resources selected by the UE for sidelink communication overlaps with a second set of resources reserved by a set of UEs, wherein the UE has a first transmission priority associated with transmitting in the first set of resources; and
means for determining, upon determining that the at least one resource is an overlapping resource, to reselect at least a subset of the first set of resources for a sidelink transmission when the overlapping resource is associated with one or more transmission priorities that are same as the first transmission priority, the at least a subset of the first set of resources comprising one of a first overlapping resource of the overlapping resource, the overlapping resource, or the overlapping resource and at least a subset of non-overlapping resources of the first set of resources.

27. The apparatus of claim 26, further comprising:
means for reserving, upon determining that the at least one resource is an overlapping resource, the at least one resource for a sidelink transmission, when at least one of a first priority associated with the at least one resource is same as a second priority associated with the second set of resources, a remaining time in a packet delay budget (PDB) for a sidelink transmission on the first set resources is greater than a threshold, or the remaining time in the PDB is greater than a remaining time in a PDB associated with the set of UEs for the second set of resources.

28. A non-transitory computer-readable medium storing computer executable code for wireless communication at a user equipment (UE), the code when executed by a processor causes the processor to:

determine that at least one resource of a first set of resources selected by the UE for sidelink communication overlaps with a second set of resources reserved by a set of UEs, wherein the UE has a first transmission priority associated with transmitting in the first set of resources; and determine, upon determining that the at least one resource is an overlapping resource, to reselect at least a subset of the first set of resources for a sidelink transmission when the overlapping resource is associated with one or more transmission priorities that are same as the first transmission priority, the at least a subset of the first set of resources comprising one of a first overlapping resource of the overlapping resource, the overlapping resource, or the overlapping resource and at least a subset of non-overlapping resources of the first set of resources.

* * * * *